United States Patent
Park

(10) Patent No.: US 9,207,863 B2
(45) Date of Patent: Dec. 8, 2015

(54) INPUT DEVICE AND INPUT METHOD

(75) Inventor: Chang Kyu Park, Jeongeup-si (KR)

(73) Assignee: Jumi Lee, Suwon-si, Gyeonggi-do (KR)

( * ) Notice: Subject to any disclaimer, the term of this patent is extended or adjusted under 35 U.S.C. 154(b) by 304 days.

(21) Appl. No.: 13/322,491

(22) PCT Filed: Apr. 16, 2010

(86) PCT No.: PCT/KR2010/002371
§ 371 (c)(1),
(2), (4) Date: Nov. 25, 2011

(87) PCT Pub. No.: WO2010/137799
PCT Pub. Date: Dec. 2, 2010

(65) Prior Publication Data
US 2012/0092262 A1   Apr. 19, 2012

(30) Foreign Application Priority Data

May 27, 2009   (KR) .......................... 10-2009-0046552

(51) Int. Cl.
*G06F 3/02* (2006.01)
*G06F 3/0488* (2013.01)

(52) U.S. Cl.
CPC .. *G06F 3/04886* (2013.01); *G06F 2203/04808* (2013.01)

(58) Field of Classification Search
None
See application file for complete search history.

(56) References Cited

U.S. PATENT DOCUMENTS

| | | | | |
|---|---|---|---|---|
| 5,825,352 A * | 10/1998 | Bisset et al. | .................. | 345/173 |
| 6,067,079 A * | 5/2000 | Shieh | .............. | 345/173 |
| 2003/0048260 A1* | 3/2003 | Matusis | ......................... | 345/173 |
| 2005/0104867 A1* | 5/2005 | Westerman et al. | .......... | 345/173 |
| 2005/0162402 A1* | 7/2005 | Watanachote | ................ | 345/173 |
| 2006/0190836 A1 | 8/2006 | Ling Su et al. | | |
| 2008/0042979 A1 | 2/2008 | Nikbin | | |
| 2010/0265204 A1* | 10/2010 | Tsuda | ........................... | 345/174 |

FOREIGN PATENT DOCUMENTS

| | | |
|---|---|---|
| JP | 2006-236143 | 9/2006 |
| KR | 10-2008-0103327 | 11/2008 |

* cited by examiner

Primary Examiner — Christopher R Lamb
(74) Attorney, Agent, or Firm — Paratus Law Group, PLLC

(57) ABSTRACT

Provided are an input device including at least one key to which a plurality of symbols are allocated, and a method of determining a symbol input by a user in the input device. The method includes tracking a plurality of input objects, receiving a key input from any one of the plurality of input objects, and determining a symbol input by a user on the basis of a relative position, which is a position of the input object in the input objects, of the input object that has generated the key input and the input key. Accordingly, it is possible to output different symbols using one key according to relative positions of an input object that has generated a key input, so that a desired symbol can be easily input through a small input device.

6 Claims, 11 Drawing Sheets

FIG. 10

| KEY | RELATIVE POSITION OF INPUT OBJECT | 1020 ◯ | 1030 △ | 1040 □ |
|---|---|---|---|---|
| 1010 | ① | • | Q | Z |
| 1011 | ② | A | B | C |
| 1012 | ③ | D | E | F |
| 1013 | ④ | G | H | I |
| 1014 | ⑤ | J | K | L |
| 1015 | ⑥ | M | N | O |
| 1016 | ⑦ | P | R | S |
| 1017 | ⑧ | T | U | V |
| 1018 | ⑨ | W | X | Y |

240

110

| .QZ | ABC | DEF |
|-----|-----|-----|
| GHI | JKL | MNO |
| PRS | TUV | WXY |

110

FIG. 13
(a) 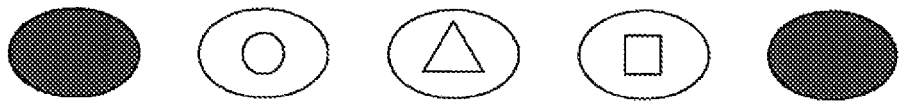
(b) 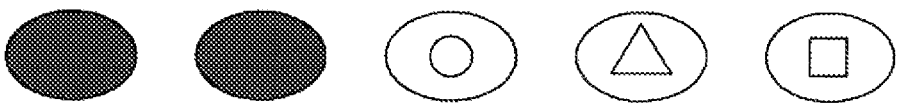
(c) 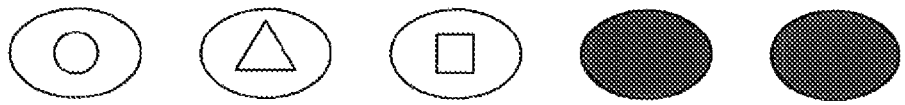

| QZ | AB | CD | EF |
|----|----|----|----|
| GH | IJ | KL | MN |
| OP | RS | TU | VW |
| XY |    |    |    |

FIG. 15
(a) 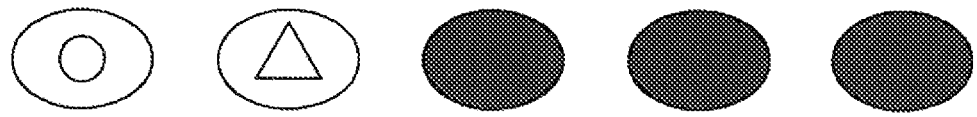
(b) 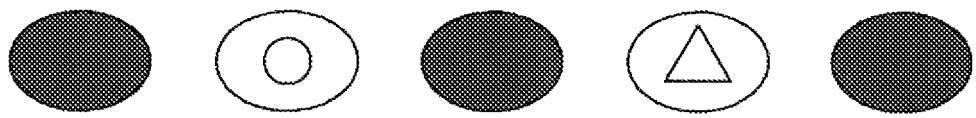

INPUT DEVICE AND INPUT METHOD

CROSS REFERENCE TO PRIOR APPLICATIONS

This application is a National Stage Patent Application of PCT International Patent Application No. PCT/KR2010/002371 (filed on Apr. 16, 2010) under 35 U.S.C. §371, which claims priority to Korean Patent Application No. 10-2009-0046552 (filed on May 27, 2009), which are all hereby incorporated by reference in their entirety.

BACKGROUND

1. Field of the Invention

The present invention relates to an input device and method and, more particularly, to an input device including at least one key to which a plurality of symbols are allocated and a method of determining a symbol input by a user in the input device.

2. Discussion of Related Art

An input device for a user interface is indispensable to a variety of electronic apparatuses. In particular, as computer-based technology has been lately introduced to cars, televisions, cellular phones, etc., the necessity for user interface technology enabling data input through a relatively small keypad or touchscreen is increasing.

SUMMARY OF THE INVENTION

According to an aspect of the present invention, there is provided a method of determining a symbol input by a user in an input device including at least one key to which a plurality of symbols are allocated. The method includes: tracking a plurality of input objects; receiving a key input from any one of the plurality of input objects; and determining the symbol input by the user on the basis of a relative position, which is a position of the input object in the input objects, of the input object that has generated the key input and the input key.

According to another aspect of the present invention, there is provided a method of determining, a symbol input by a user in an input device. The method includes: setting M (M is equal to or less than N and greater than 1) valid input objects among N input objects according to an input of the user, and providing an input means including at least one key to which M symbols are allocated; receiving, at the input means, a key input from any one of the valid input objects; and determining the symbol input by the user on the basis of a relative position, which is a position of the valid input object in the valid input objects, of the valid input object that has generated the key input and the input key.

According to still another aspect of the present invention, there is provided an input device including at least one key to which a plurality of symbols are allocated. The input device includes: a tracker configured to track a plurality of input objects; a key input unit configured to receive a key input from any one of the plurality of input objects; and a symbol determiner configured to determine a symbol input by a user on the basis of a relative position, which is a position of the input object in the input objects, of the input object that has generated the key input and the input key.

According to yet another aspect of the present invention, there is provided an input device including: an input means provider configured to set M (M is equal to or less than N and greater than 1) valid input objects among N input objects according to an input of a user, and provide an input means including at least one key to which M symbols are allocated; and a symbol determiner configured to, when a key input is received from any one of the valid input objects through the input means, determine a symbol input by the user on the basis of a relative position, which is a position of the valid input object in the valid input objects, of the valid input object that has generated the key input and the input key.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 10 shows a table stored in a storage of FIG. 2;

FIG. 13 illustrates an example in which the key input unit of FIG. 11 receives a plurality of key inputs from a plurality of input objects in the standby state and a key input from an input object in an active state;

FIG. 14 illustrates an example in which two symbols are allocated to each of the plurality of keys constituting the key input unit of FIG. 1; and FIG. 15 illustrates an example in which the key input unit of FIG. 14 receives a plurality of key inputs from a plurality of input objects in the standby state.

DETAILED DESCRIPTION OF EXEMPLARY EMBODIMENTS

Figure 1:
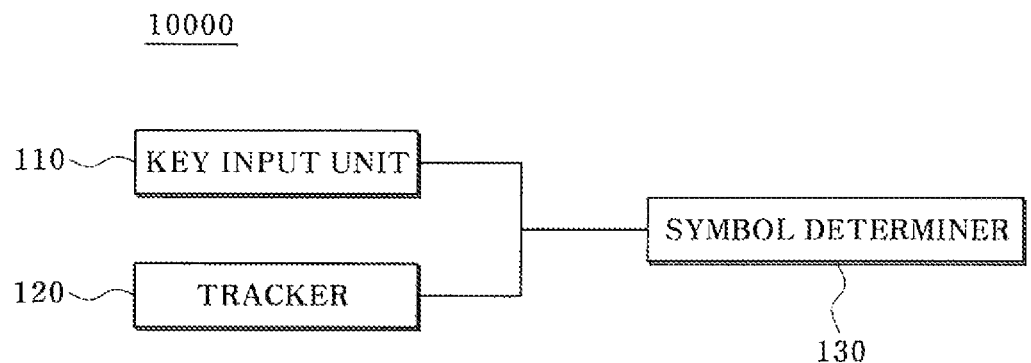
FIG. 1 is a block diagram of an input device according to an exemplary embodiment of the present invention.

Since specific structural and functional details disclosed herein are merely representative for purposes of describing exemplary embodiments of the present invention, exemplary embodiments of the present invention may be embodied in many alternate forms and should not be construed as limited to exemplary embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

As used herein, the term "and/or" includes any and all combinations of one or more of the associated listed items. For example, "a first item, a second item and/or a third item" means combinations of at least two of the first, second and third items as well as the first item, the second item and the third item.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In exemplary embodiments below, an "input object" denotes a tool including a human finger, which is a physical object that can perform an independent key input action with a contact end generating a key input. A "position of an input object" denotes three-dimensional (3D) coordinates representing a position of a contact end generating a key input, or a one-dimensional (1D) coordinate or two-dimensional (2D) coordinates whereby a plurality of symbols allocated to a key can be separately determined. As a positional order of an input object among input objects in a specific direction, a "relative position of an input object" denotes a disposition relationship among the respective input objects when an input device senses and specifies the input object.

FIG. 1 is a block diagram of an input device according to an exemplary embodiment of the present invention.

Referring to FIG. 1, an input device 10000 includes a key input unit 110, a tracker 120, and a symbol determiner 130.

The key input unit 110 includes a plurality of keys. In an input standby state, the key input unit 110 receives a key input from any one of a plurality of input objects. As an example, the input objects may be fingers of a user. As another example, the input objects may be fingers of a user and a pen. As still another example, the input objects may be supplementary tools for convenience or accommodating a disability. The key input unit 110 may be implemented as a keypad having physical buttons or in the form of a touchscreen, and may include any means capable of recognizing a motion of an input object according to a user's intention to input a key.

The tracker 120 tracks the plurality of input objects within a tracking area in the input standby state. For example, the tracker 120 may obtain images of the input objects using image sensors, light-emitting devices and light-receiving devices, or infrared sensors arranged on a surface of the input device 10000, and compare previous positions of the input objects with current positions, thereby tracking the input objects. Here, a range of the tracking area may be determined according to an area in which the image sensors, the light-emitting devices and the light-receiving devices, or the infrared sensors can obtain images.

When an input object other than the plurality of input objects being tracked enters the tracking area, the tracker 120 determines whether the entering input object corresponds to one of a plurality of input objects set to be valid in a preparation step of the input device 10000 on the basis of a relative position of the entering input object in the plurality of input objects being tracked. Here, in the preparation step, input objects to be tracked are determined, and tracking is started. As an example, when a predetermined number of input objects are sensed, the input device 10000 may determine the sensed input objects as valid input objects for tracking and start tracking them. As another example, when a plurality of key inputs are received from a plurality of input objects, the input device 10000 may determine the input objects having generated the plurality of key inputs as valid input objects for tracking and start tracking them.

When it is determined that the entering input object corresponds to one of the plurality of valid input objects, the tracker 120 starts tracking the entering input object. At this time, the tracker 120 may restore the relative position of the entering input object in the plurality of input objects being tracked, thereby performing tracking. When it is determined that the entering input object corresponds to none of the plurality of valid input objects, the tracker 120 does not track the entering input object.

When some of the plurality of valid input objects set in the preparation step go out of the tracking area, the tracker 120 continuously tracks input objects remaining in the tracking area.

The tracker 120 detects spatial positions and relative positions of the plurality of input objects moving in the tracking area on the basis of a key position of the key input unit 110, and continuously transfers information on, the detected spatial positions and relative positions to the symbol determiner 130. The tracker 120 may track the plurality of input objects moving in the tracking area, detect a relative position of an input object that has generated a key input when the key input unit 110 receives the key input, and transfer information on the relative position to the symbol determiner 130.

The symbol determiner 130 determines a symbol on the basis of the relative position of the input object that has generated the key input and the input key. Since a plurality of symbols are allocated to the respective keys constituting the key input unit 110, the symbol determiner 130 determines a symbol on the basis of the input key and the relative position of the input object that has generated the key input. As an example, the symbol determiner 130 may calculate a relative position of an input object present on the corresponding key using spatial position information and relative position information received from the tracker 120 when the key input unit 110 receives the key input, and determine a symbol on the basis of the calculated relative position and the input key. As another example, the symbol determiner 130 may receive relative position information on an input object present on the corresponding key from the tracker 120 when the key input unit 110 receives the key input, and determine a symbol on the basis of the received relative position information and the input key.

Figure 2:
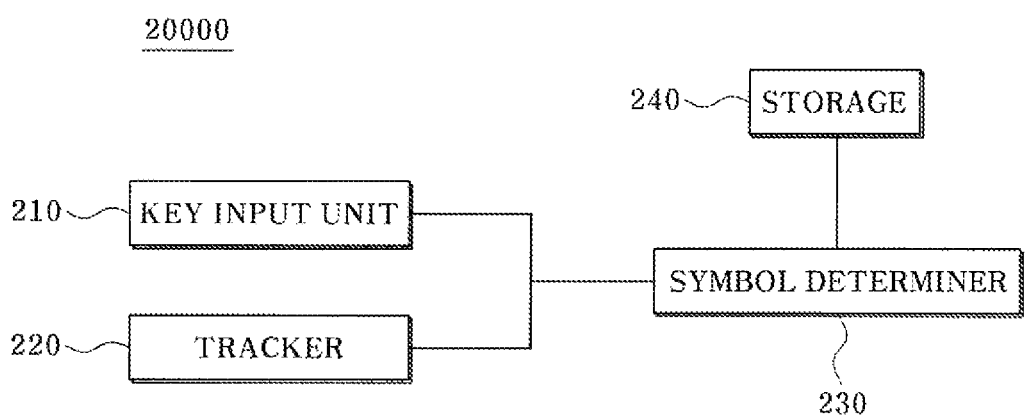
FIG. 2 is a block diagram of an input device according to another exemplary embodiment of the present invention.

FIG. 2 is a block diagram of an input device according to another exemplary embodiment of the present invention.

Referring to FIG. 2, an input device 20000 includes a key input unit 210, a tracker 220, a symbol determiner 230 and a storage 240. The key input unit 210, the tracker 220 and the symbol determiner 230 are the same as the key input unit 110, the tracker 120 and the symbol determiner 130 of FIG. 1 respectively, and thus detailed description thereof will be omitted.

The storage 240 stores a table allocating a plurality of symbols corresponding to a plurality of keys constituting the key input unit 210 and relative positions of input objects. The table may allocate a plurality of symbols to each key. Here, a plurality of symbols allocated to each key have different relative positions of an input object, and thus each symbol may be specified by one key and one relative position. Relations stored in the storage 240 and specified by a plurality of symbols allocated to an input key and a relative position of an input object may be changed for a user's convenience. Also, the storage 240 has a variety of tables, and one of the tables may be determined according to a setting recognized in the preparation step.

The symbol determiner 230 determines a symbol corresponding to a relative position of an input object that has generated a key input and the input key with reference to a table stored in the storage 240.

Figure 3:
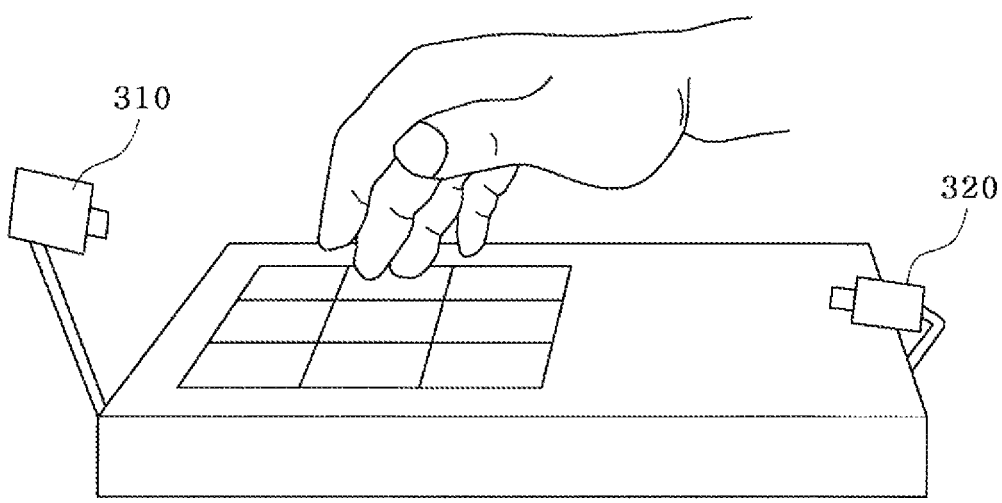
FIG. 3 illustrates an example in which a tracker of FIG. 1 obtains images of input objects.

FIG. 3 illustrates an example in which the tracker of FIG. 1 obtains images of input objects.

Referring to FIG. 3, the tracker 120 includes a plurality of image sensors 310 and 320. Here, the plurality of image sensors may be installed in an upper side and/or a lower side of the input device 10000, and may be charge-coupled device (CCD) image sensors or complementary metal oxide semiconductor (CMOS) image sensors.

The first image sensor 310 is installed in the upper side of the input device 10000 and obtains images of a plurality of input objects from the viewpoint of the installed position. The second image sensor 320 is installed in the lower side of the input device 10000 and obtains images of a plurality of input objects from the viewpoint of the installed position.

Figure 4:
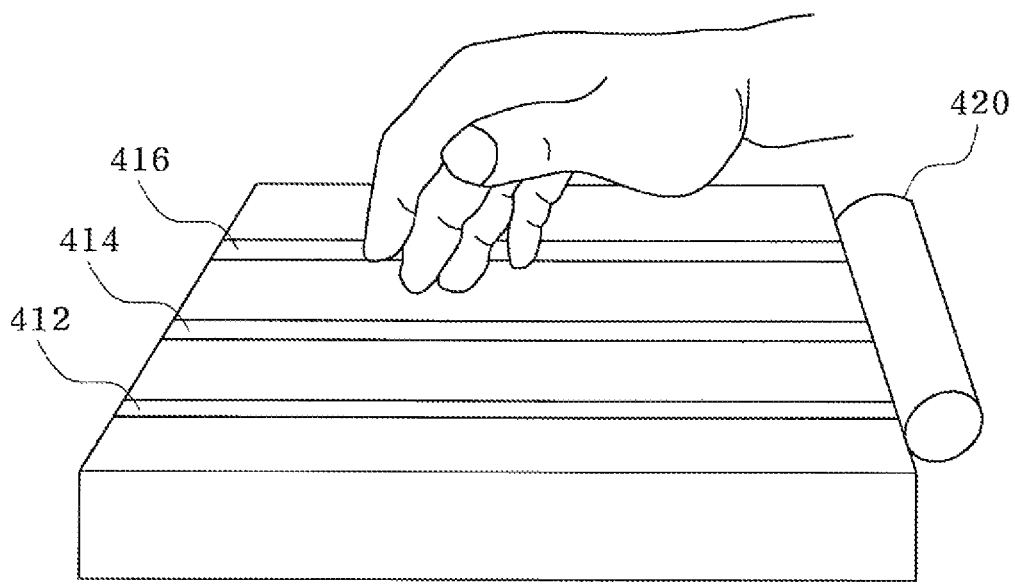
FIG. 4 illustrates another example in which the tracker of FIG. 1 obtains images of input objects.

FIG. 4 illustrates another example in which the tracker of FIG. 1 obtains images of input objects.

Referring to FIG. 4, the tracker 120 includes a plurality of light-emitting devices 412, 414 and 416 and a light receiver 420.

The light-emitting devices 412, 414 and 416 are disposed in the form of a net or in a line toward the upper side of the input device 10000, and sequentially emit light to a plurality of input objects. For example, the light-emitting devices 412, 414 and 416 may be light-emitting diodes (LEDs) or semiconductor lasers. The light-emitting devices 412, 414 and 416 sequentially emit light, for example, beginning with the light emitting devices 412 constituting a first column and ending with the light emitting devices 416 constituting the last column, that is, the light-emitting devices 412 constituting the first column emit light and then stop emitting light, after which the light-emitting devices 414 constituting the second column emit light.

The light receiver 420 receives the light emitted by the light-emitting devices 412, 414 and 416 and reflected by the plurality of input objects, and generates a signal corresponding to the intensity of the received light. For example, the intensity of light received by the light receiver 420 varies according to whether an adjacent input object is present when the respective light-emitting devices 412, 414 and 416 emit light, and the intensity of reflected light increases when an input object is above a light-emitting device that emits light. When the light-emitting devices 412, 414 and 416 separately emit light at time intervals, and the light receiver 420 collects reflected light of the light sequentially emitted by all the light-emitting devices 412, 414 and 416 and analyzes luminous intensity distribution, it is possible to obtain information on images corresponding to 1D shapes of a plurality of input objects in an area close to above portions of the light emitting devices 412, 414 and 416. At this time, 2D information may be collected by disposing the light-emitting devices of point light sources in a lattice form and sequentially turning on the respective light-emitting devices, or when a plurality of input objects are arranged in a horizontal axis, only position information on an input object on the horizontal axis may be obtained by simultaneously turning on light-emitting devices included in one column.

Alternatively, the light-emitting devices 412, 414 and 416 and the light receiver 420 may exchange their positions according to embodiments. For example, light-emitting devices may be disposed at the position of the light receiver 420 to emit light toward input objects, and a light receiver may be disposed at the positions of the light-emitting devices 412, 414 and 416 in the form of a net or in a line to receive light reflected by the input objects.

Figure 5:
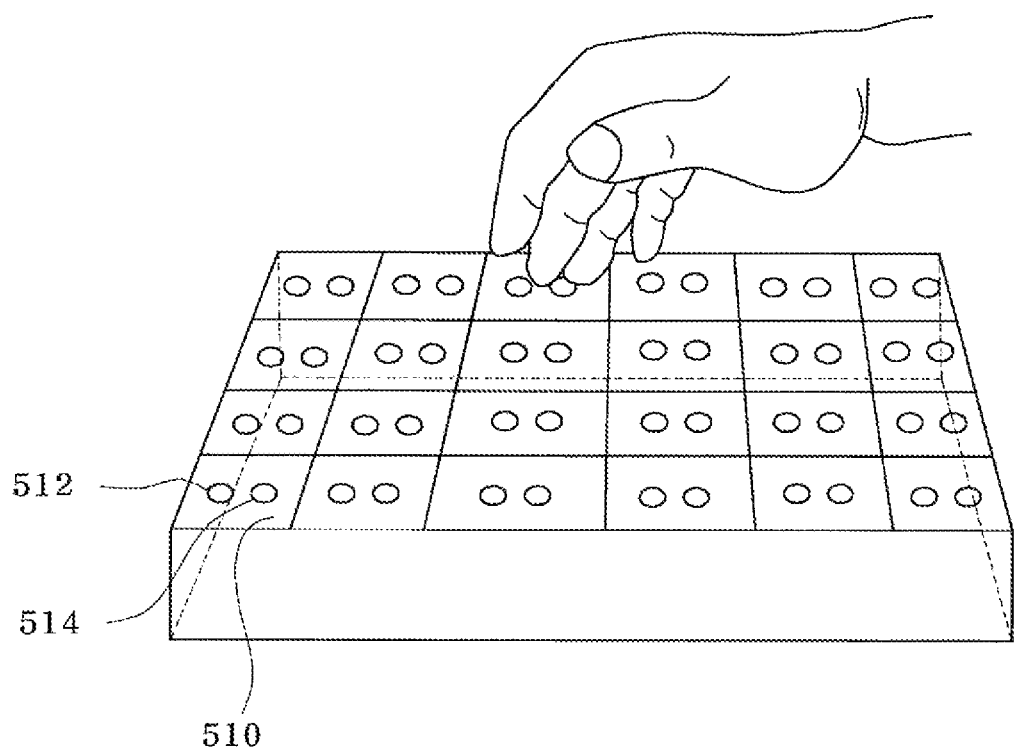
FIG. 5 illustrates still another example in which the tracker of FIG. 1 obtains images of input objects.

FIG. 5 illustrates still another example in which the tracker of FIG. 1 obtains images of input objects.

Referring to FIG. 5, the tracker 120 includes optical sensors 510. For example, the optical sensors 510 may sense an optical signal in the infrared region.

The optical sensors 510 are densely arranged as a net on a front side of the input device 10000. Each of the optical sensors 510 includes an emitter 512 that emits an optical signal, and a detector 514 that senses the optical signal.

When an input object, for example, a fingertip, approaches the emitter 512 while the emitter 512 is emitting the optical signal, a part of the optical signal emitted by the emitter 512 is reflected by the fingertip, and the detector 514 senses the reflected optical signal. By collecting the quantities of light of the optical signals sensed by the respective detectors 514 of all the optical sensors 510 and disposing the quantities of light of the optical signals according to positions, it is possible to generate 2D information similar to an image of an input image.

Figure 6:
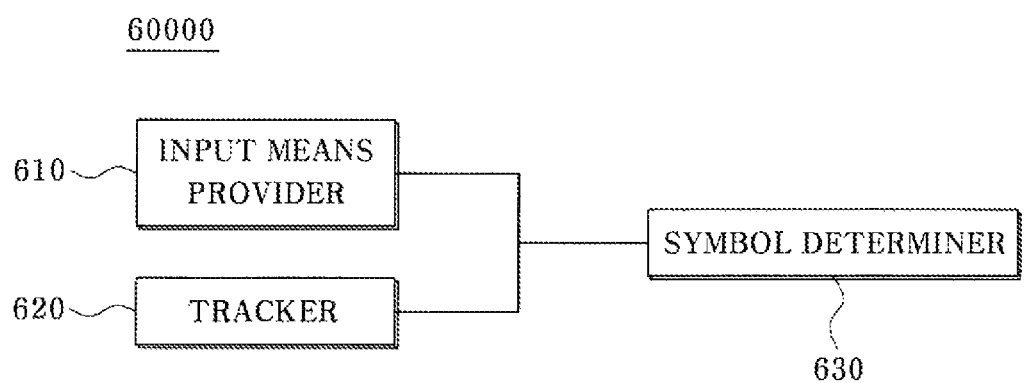
FIG. 6 is a block diagram of an input device according to still another exemplary embodiment of the present invention.

FIG. 6 is a block diagram of an input device according to still another exemplary embodiment of the present invention.

Referring to FIG. 6, an input device 60000 includes an input means provider 610, a tracker 620, and a symbol determiner 630. The tracker 620 and the symbol determiner 630 of FIG. 6 are the same as the tracker 120 and the symbol determiner 130 shown in FIG. 1 respectively, and thus detailed description thereof will be omitted.

The input device 60000 has user interfaces of various forms including a touchscreen, and provides input means corresponding to M (M is a number equal to or less than N) valid input objects selected from among a total of N input objects.

The input means provider 610 provides a user with an input means including at least one key to which M symbols are allocated. For example, the input means provider 610 may provide the user with a key input screen consisting of a plurality of keys as an input means. The input means provider 610 has a function of providing the user with the key input screen. When one of the input objects approaches a key provided by the input means provider 610 within a predetermined distance, the input means provider 610 may provide the user with symbols that can be input on the basis of a relative position of the approaching input object.

The input means provider 610 receives a key input from any one of the M valid input objects.

Figure 7:
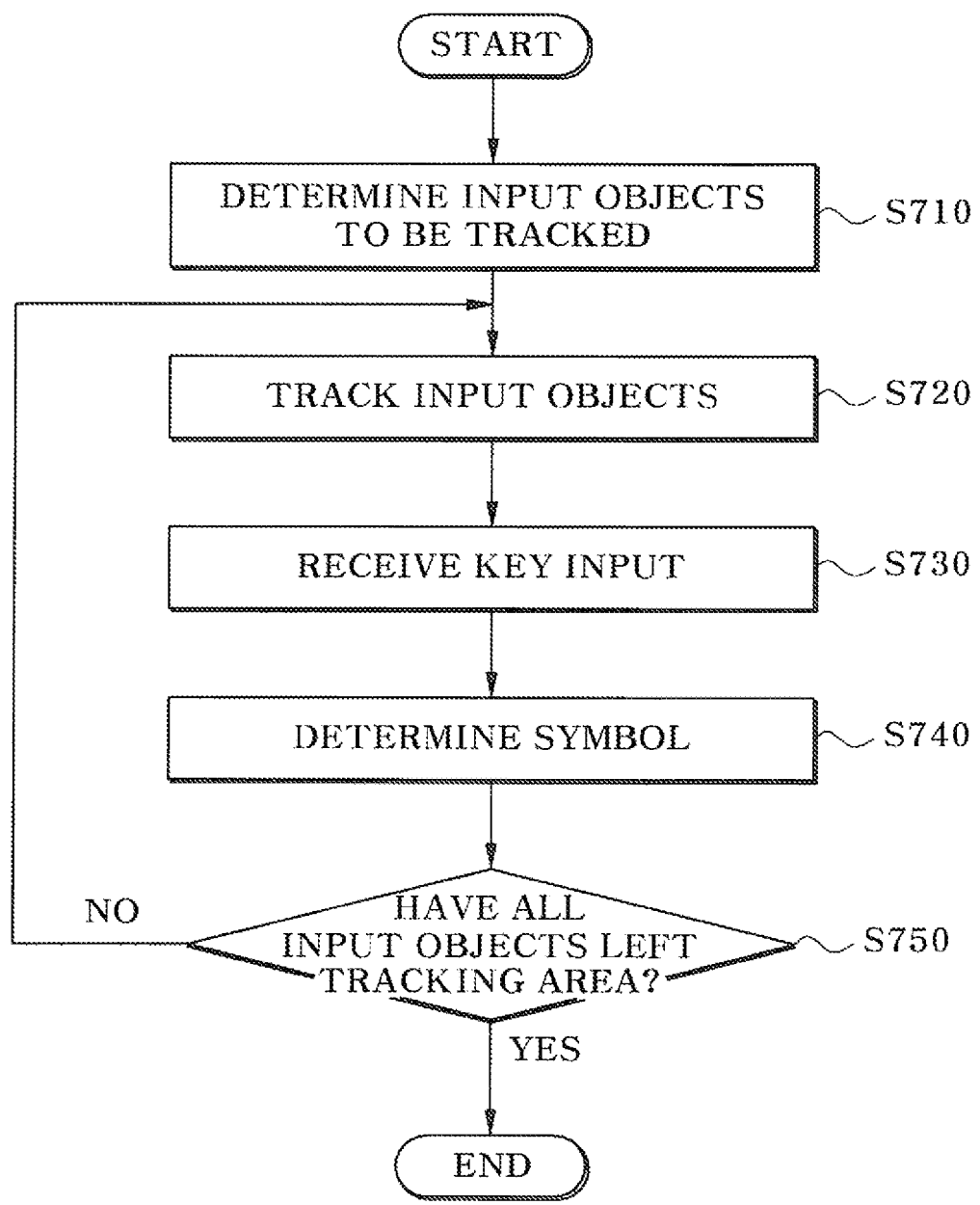
FIG. 7 is a flowchart illustrating a method of determining an input symbol according to an exemplary embodiment of the present invention.

FIG. 7 is a flowchart illustrating a method of determining an input symbol according to an exemplary embodiment of the present invention.

Referring to FIG. 7, an input device determines a plurality of input objects to track (S710). As an example, when a predetermined number of input objects are sensed, the input device determines the sensed input objects as input objects to track. As another example, when a plurality of key inputs are received from a plurality of input objects, the input device determines the input objects having generated the plurality of key inputs as input objects to track.

The input device tracks the plurality of input objects in a tracking area (S720). For example, when it is determined in step 710 to track three input objects, the input device may track each of the three input objects. Here, the input device may compare previous positions of the input objects with current positions, thereby tracking the input objects. When an input object other than the plurality of input objects being tracked enters the tracking area, the input device determines whether the entering input object corresponds to one of the plurality of input objects determined in step 710 on the basis of a relative position of the entering input object in the plurality of input objects being tracked. When it is determined that the entering input object corresponds to one of the plurality of input objects, the input device starts tracking the entering input object. On the other hand, when it is determined that the entering input object is a new input object corresponding to none of the plurality of input objects, the input device does not track the entering input object. When some of the plurality of input objects being tracked leave the tracking area, the input device continuously tracks input objects remaining in the tracking area while maintaining a previously designated relative relationship among the input objects. When an input object that has left the tracking area reenters the tracking area, the input device restores a relative position of the reentering input object in the existing input objects and restarts tracking of the reentering input object.

The input device receives a key input from at least one of the plurality of input objects being tracked (S730).

The input device determines a symbol on the basis of a relative position of the input object that has generated the key input in step 730 and the input key (S740). As an example, the input device may detect a relative position of an input object that has generated a key input when the key input is received, and determine a symbol on the basis of the detected relative position and the input key. As another example, the input device may continuously detect spatial positions and relative positions of a plurality of input objects moving in the tracking area, and determine a symbol on the basis of the relative positions detected when the key input is received and the input key. For example, the input device may determine a symbol with reference to a table stored in an internal memory. The table may allocate a plurality of symbols to each key. Here, a plurality of symbols allocated to each key have different relative positions, and thus each symbol may be specified by one key and one relative position.

The input device determines whether or not all the plurality of input objects have left the tracking area (S750). When it is determined that at least one of the input objects is in the tracking area, the input devices performs step 720 to continue tracking.

Figure 8:
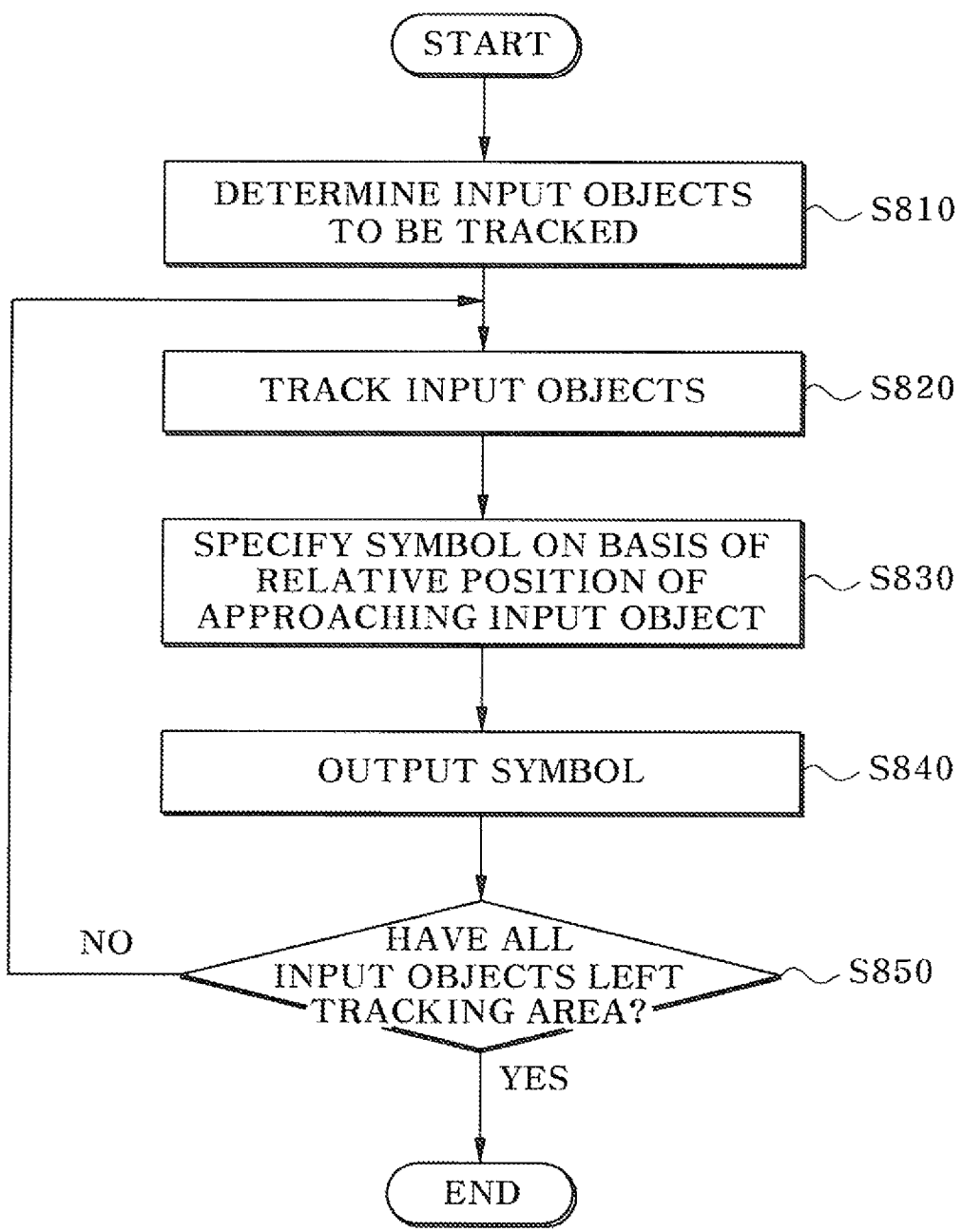
FIG. 8 is a flowchart illustrating a method of determining an input symbol according to another exemplary embodiment of the present invention.

FIG. 8 is a flowchart illustrating a method of determining an input symbol according to another exemplary embodiment of the present invention.

Referring to FIG. 8, an input device determines a plurality of input objects to track (S810). Step 810 is the same as step 710 of FIG. 7, and thus detailed description thereof will be omitted.

The input device tracks the plurality of input objects in a tracking area (S820). Step 820 is the same as step 720 of FIG. 7, and this detailed description thereof will be omitted.

When one of the plurality of input objects being tracked approaches a key in the input device within a predetermined distance, the input device specifies one of a plurality of symbols allocated to the key on the basis of a relative position of the approaching input object (S830). For example, the input device may specify a symbol with reference to a table stored in an internal memory. The table indicates a plurality of symbols allocated to each key, and a plurality of symbols allocated to each key may be specified by relative positions of a used input object. The input device detects a relative position of an input object that can make an input and allocates the corresponding symbol to the corresponding key. Here, the input device may display the specified symbol in various ways, such as displaying the specified symbol in a large size or in a distinguishable color, so that a user can identify the symbol.

When a key input is received, the input device outputs the specified symbol (S840).

The input device determines whether or not all the plurality of input objects have left the tracking area (S850). When it is determined that at least one of the input objects is in the tracking area, the input devices performs step 820 to continue tracking.

Figure 9:
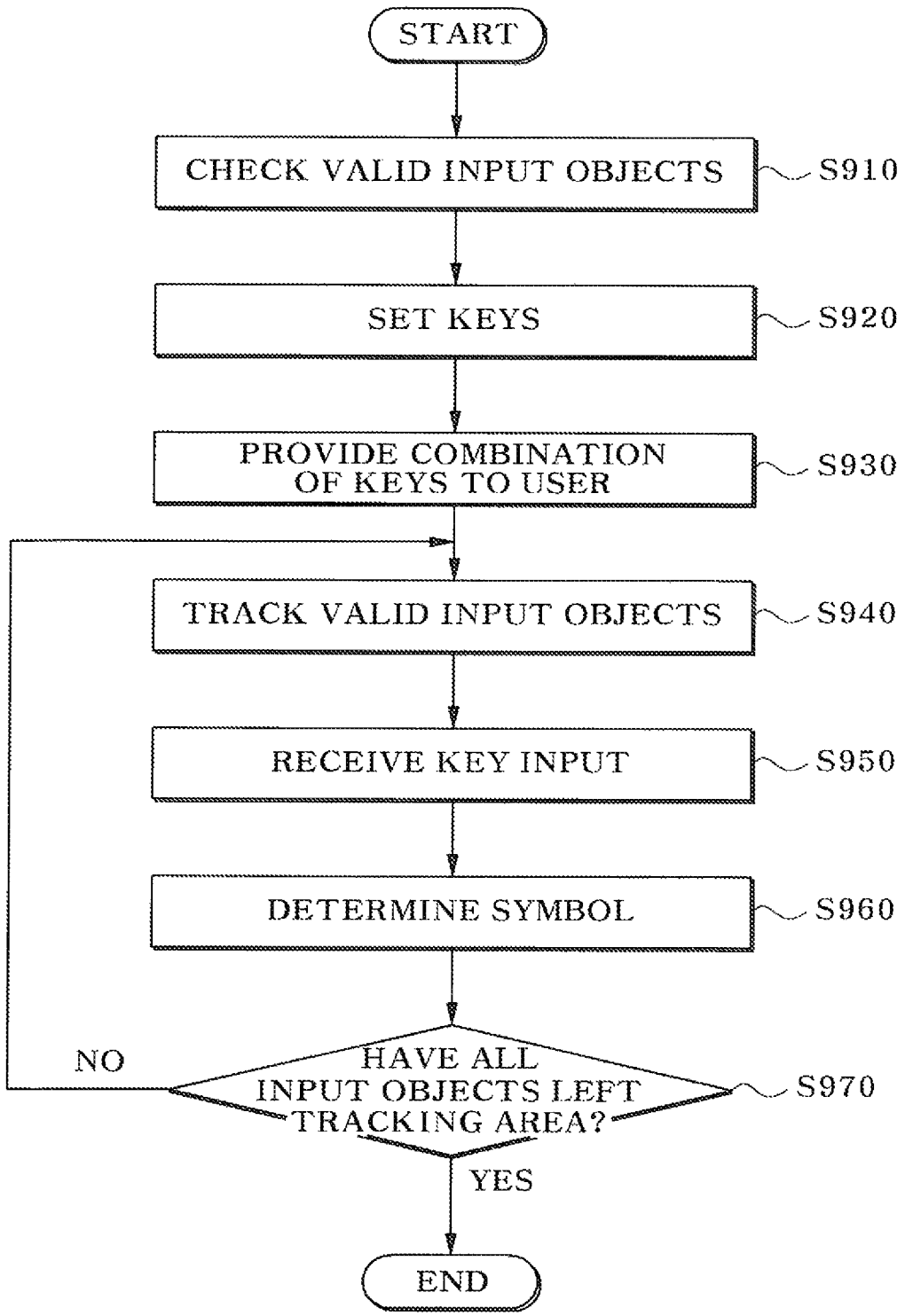
FIG. 9 is a flowchart illustrating a method of determining an input symbol according to still another exemplary embodiment of the present invention.

FIG. 9 is a flowchart illustrating a method of determining an input symbol according to still another exemplary embodiment of the present invention.

Referring to FIG. 9, an input device checks M of N input objects as valid input objects in a specific area (S910).

The input device sets keys according to characteristics of the M valid input objects (S920). For example, the input device may be implemented as a touchscreen, and may allocate M symbols to one key when key inputs are received from M fingers of a user. When the number of valid input objects is three, a combination of keys to each of which three symbols are allocated may be set, and when the number of valid input objects is two, a combination of keys to each of which two symbols are allocated may be set.

The input device provides a user with a combination of keys corresponding to the M input objects that have generated key inputs (S930). Here, an input means includes at least one key to which M symbols are allocated.

The input device tracks the M input objects that have generated the key inputs (S940). Here, the input device may compare current positions of the M input objects with previous positions, thereby tracking the input objects.

The input device receives a key input from any one of the M input objects (S950).

The input device determines a symbol on the basis of a relative position of the input object that has generated the key input and the input key (S960). Here, the relative position of the input object is a position of the input object that has generated the key input among the M input objects being tracked. For example, the input device may determine a symbol with reference to a table stored in an internal memory. The table may allocate a plurality of symbols to each key. Here, a plurality of symbols allocated to each key have different relative positions, and thus each symbol may be specified by one key and one relative position.

The input device determines whether or not all the plurality of input objects have left the tracking area (S970). When it is determined that at least one of the input objects is in the tracking area, the input devices performs step 940 to continue tracking.

FIG. 10 shows a table stored in the storage of FIG. 2.

Referring to FIG. 10, each key includes a plurality of symbols, and each symbol is specified by one key and a relative position of one input object. For example, a first key 1010 includes three symbols of ".", "Q" and "Z" identified according to relative positions 1020, 1030 and 1040 of an input object. Likewise, each of a second key 1011 to a ninth key 1018 includes three symbols identified according to relative positions of an input object.

Figures 11, 12:
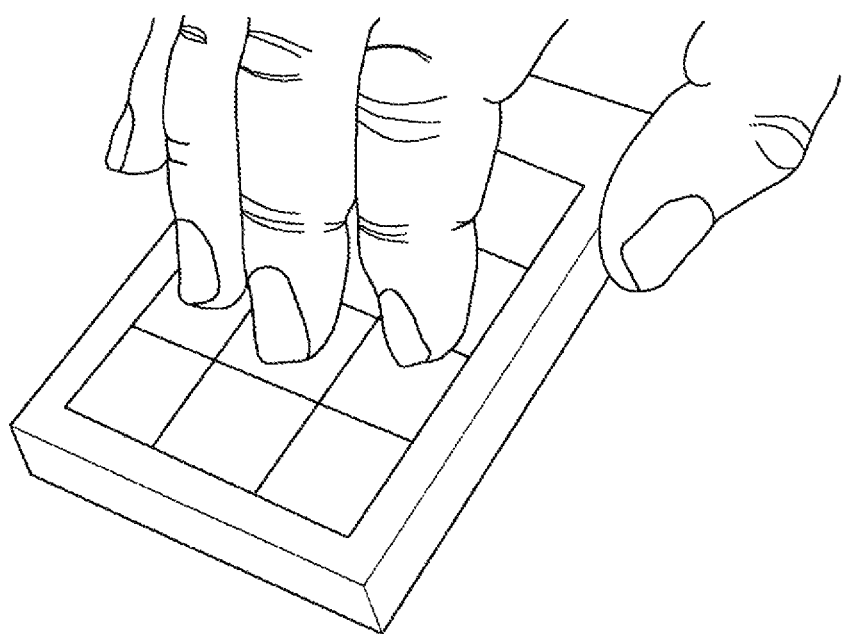
FIG. 11 illustrates an example in which three symbols are allocated to each of a plurality of keys constituting a key input unit of FIG. 1.
FIG. 12 illustrates an example in which the key input unit of FIG. 11 receives a plurality of key inputs from a plurality of input objects in a standby state.

FIG. 11 illustrates an example in which three symbols are allocated to each of a plurality of keys constituting the key input unit of FIG. 1.

Referring to FIG. 11, the key input unit 110 may consist of a plurality of keys each including three symbols "Q Z", "A B C", "D E F", "G H I", "J K L", "M N O", "P R S", "T U V", or "W X Y".

FIG. 12 illustrates an example in which the key input unit of FIG. 11 receives a plurality of key inputs from a plurality of input objects in the standby state.

Referring to FIG. 12, the key input unit 110 receives three key inputs from three fingers of a user. Since the key input unit 110 has received the three key inputs from the three fingers at first, the tracker 120 tracks the three fingers.

FIG. 13 illustrates an example in which the key input unit of FIG. 11 receives a plurality of key inputs from a plurality of input objects in the standby state and a key input from an input object in an active state.

Referring to FIG. 13(A), the key input unit 110 receives key inputs from an index finger, a middle finger and a ring finger in the standby state.

Subsequently, when the key input unit 110 receives a key input "D E F" from the index finger, the tracker 120 detects a relative position ○ of the index finger. The symbol determiner 130 outputs "D", a symbol corresponding to the key input "D E F" and the detected relative position ○.

When the key input unit 110 receives the key input "D E F" from the middle finger, the tracker 120 detects a relative position Δ of the middle finger, and the symbol determiner 130 outputs "E", a symbol corresponding to the key input "D E F" and the detected relative position Δ. When the key input unit 110 receives the key input "D E F" from the ring finger, the tracker 120 detects a relative position □ of the ring finger, and the symbol determiner 130 outputs "F", a symbol corresponding to the key input "D E F" and the detected relative position □.

Referring to FIG. 13(B), the key input unit 110 may receive key inputs from a middle finger, a ring finger and a little finger in the standby state. Referring to FIG. 13(C), the key input unit 110 may receive key inputs from a thumb, an index finger and a middle finger in the standby state. As illustrated in FIG. 13(A), in the cases of FIGS. 13(B) and 13(C), the symbol determiner 130 outputs a symbol corresponding to a key operated by a finger and a relative position of the finger that has generated the key input.

Figure 14:
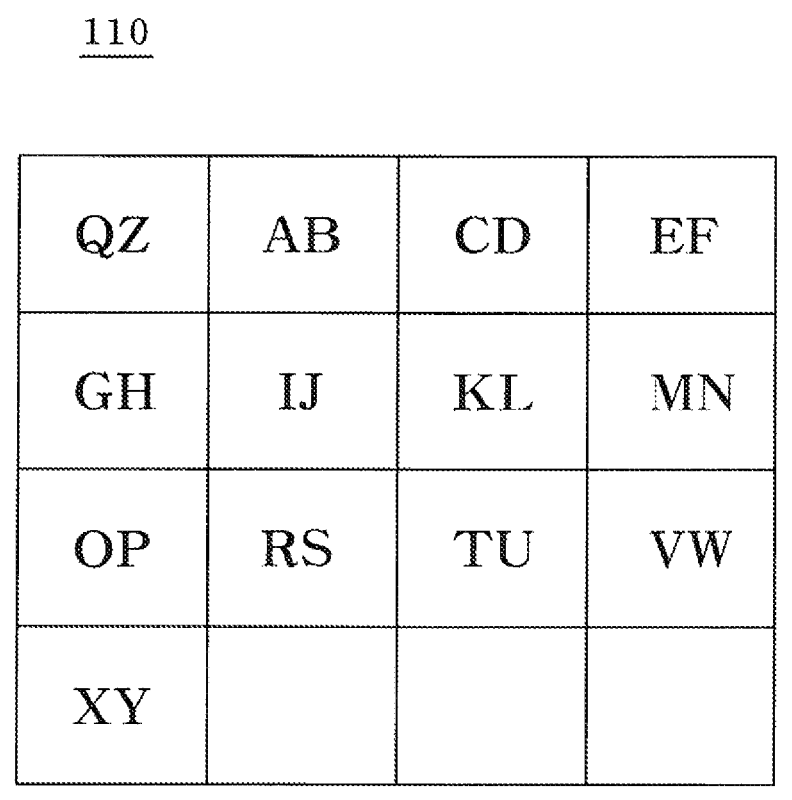

FIG. 14 illustrates an example in which two symbols are allocated to each of the plurality of keys constituting the key input unit of FIG. 1.

Referring to FIG. 14, the key input unit 110 may consist of a plurality of keys each including two symbols "Q Z", "A B", "C D", "E F", "G H", "I J", "K L", "M N", "O P", "R S", "T U", "V W" or "X Y".

FIG. 15 illustrates an example in which the key input unit of FIG. 14 receives a plurality of key inputs from a plurality of input objects in the standby state.

Referring to FIG. 15(A), when the key input unit 110 receives key inputs from a thumb and an index finger of a user, the tracker 120 may track the thumb and index finger. Subsequently, when the key input unit 110 receives a key input "QZ" from the thumb, the tracker 120 detects a relative position ○ of the thumb, and the symbol determiner 130 outputs "Q", a symbol corresponding to the key input "QZ" and the detected relative position ○.

Referring to FIG. 15(B), when the key input unit 110 receives key inputs from an index finger and a ring finger of user, the tracker 120 may track the index finger and the ring finger. Subsequently, when the key input unit 110 receives a key input "QZ" from the ring finger, the tracker 120 detects a relative position Δ of the ring finger, and the symbol determiner 130 outputs "Z", a symbol corresponding to the key input "QZ" and the detected relative position Δ.

Such an input method may be applied to operation, performed with one hand or one input means as well as operation performed with two hands or a plurality of input means. As an example, if two symbols are allocated to each key as shown in FIG. 14, the above-described input method may be applied as is even when one finger from each of both hands is used.

The disclosed technology has the following effects. However, this does not mean that a specific exemplary embodiment should have all or only these effects, and thus the scope of the disclosed technology is not limited to these effects.

An input device according to an exemplary embodiment can output different symbols using one key according to relative positions of an input object that has generated a key input, thus providing a user interface facilitating input of a desired symbol through a small input device.

An input device according to an exemplary embodiment can output different symbols according to input objects without adding sensing equipment to an input object such as a finger, and thus is convenient to use.

An input device according to an exemplary embodiment can provide users with keys of various forms according to input objects input in a preparation step, thus enabling intuitive key input according to preference or habits of the respective users.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of determining a symbol based on input applied to an input device including at least one key, the method comprising:
   identifying a plurality of input objects which enter a tracking area of the input device;

receiving a plurality of key inputs by at least two input objects of the plurality of input objects;

upon receiving the plurality of key inputs, detecting initial positions of the at least two input objects in the tracking area;

tracking spatial movement of the at least two input objects respectively while at least one input object of the at least two input objects is moving in the tracking area;

receiving a key input applied to one key of the at least one key by one input object of the at least two input objects;

upon receiving the key input, identifying an identifier of the one input object based on the tracked spatial movement of the one input object among the at least two input objects; and determining a symbol from a plurality of symbols allocated in the one key which receives the key input based on relative position of the one input object among the at least two input objects at the time of receiving the plurality of key inputs by the at least two input objects.

2. The method of claim 1, wherein the plurality of input objects comprise fingers and input pens.

3. The method of claim 1, wherein tracking spatial movement of the at least two input objects further comprises,
obtaining images of the input objects using an image sensor; and tracking respective the spatial movement of tips of the at least two input objects using the obtained images.

4. The method of claim 1, wherein tracking spatial movement of the at least two input objects further comprises,
obtaining position information on the input objects using light-emitting devices sequentially emitting light one row after another and light-receiving devices receiving light reflected and returned by the at least two input objects; and
tracking the spatial movement of the at least two input objects using the obtained position information.

5. The method of claim 1, wherein tracking spatial movement of the at least two input objects further comprises,
obtaining data matrices of the input objects using optical sensors that are arranged in the form of a net and emit and receive an optical signal; and
tracking the spatial movement of the at least two input objects using the obtained images.

6. The method of claim 1, wherein identifying a plurality of input objects comprises,
identifying the plurality of input objects which enter the tracking area initially;
identifying at least one input object which leaves the tracking area among the plurality of input objects; and
identifying at least one input object which reenters the tracking area,
wherein the at least one input object which reenters the tracking area is identified based on the initial position of the at least one input object which reenters the tracking area.

* * * * *